United States Patent
Lee et al.

(10) Patent No.: US 9,965,967 B1
(45) Date of Patent: May 8, 2018

(54) BOOK DETECTION SYSTEM FOR SCHOOL CHILDREN

(71) Applicants: Yu-Tzu Lee, Changhua (TW); Tsair-Rong Chen, Changhua (TW)

(72) Inventors: Yu-Tzu Lee, Changhua (TW); Tsair-Rong Chen, Changhua (TW)

(73) Assignees: Hsin-Cheng Tseng, Changhua (TW); Changhua University of Education, Changua (TW)

( * ) Notice: Subject to any disclaimer, the term of this patent is extended or adjusted under 35 U.S.C. 154(b) by 0 days. days.

(21) Appl. No.: 15/601,810

(22) Filed: May 22, 2017

(51) Int. Cl.
| | |
|---|---|
| *G09B 5/00* | (2006.01) |
| *G06K 7/10* | (2006.01) |
| *G06K 19/07* | (2006.01) |
| *A45F 3/00* | (2006.01) |
| *G08B 21/24* | (2006.01) |
| *G06K 19/06* | (2006.01) |

(52) U.S. Cl.
CPC .................. *G09B 5/00* (2013.01); *A45F 3/00* (2013.01); *G06K 7/10297* (2013.01); *G06K 19/0723* (2013.01); *G08B 21/24* (2013.01); *A45F 2003/001* (2013.01); *G06K 2007/10504* (2013.01); *G06K 2019/06253* (2013.01)

(58) Field of Classification Search
None
See application file for complete search history.

(56) References Cited

U.S. PATENT DOCUMENTS

| | | | | |
|---|---|---|---|---|
| 2006/0258289 | A1* | 11/2006 | Dua | G06F 17/30058 455/41.3 |
| 2013/0124362 | A1* | 5/2013 | Katcher | G06Q 30/0633 705/26.8 |
| 2014/0326771 | A1* | 11/2014 | Almalki | A45F 3/04 224/576 |
| 2015/0278928 | A1* | 10/2015 | Nichols | G06Q 30/0639 705/26.9 |

FOREIGN PATENT DOCUMENTS

KR     20090080771 A  *  7/2009

* cited by examiner

*Primary Examiner* — Kristy A Haupt
(74) *Attorney, Agent, or Firm* — Che-Yang Chen; Law Offices of Scott Warmuth (57) ABSTRACT

An RFID book detection system for school children may comprise a plurality of book jackets, at least an assignment system, and a school bag. The book jackets respectively fit around different books, and each of the book jackets has a corresponding RFID tag on a surface thereof. The assignment system is provided for saving and managing input information including at least a curriculum and RFIDs on the RFID tags, and the school bag used for placing the books comprises a sensor which is connected to the assignment system to check whether the books in the school bag are exactly the same as the next day's course schedule on the input curriculum saved in the assignment system. Thus, the child can scan the RFIF tags on the book jackets one by one before putting the books into the school bag, which helps child to learn packing his/her school bag independently.

9 Claims, 11 Drawing Sheets

BOOK DETECTION SYSTEM FOR SCHOOL CHILDREN

FIELD OF THE INVENTION

The present invention relates to a book detection system and more particularly to an RFID (Radio Frequency Identification) book detection system to assisting school children to pack their school bags.

BACKGROUND OF THE INVENTION

Generally, for most of the school children especially who just begin school, they always need their parents to pack the school bags for them, and over times, the children may be overly dependent on their parents, resulting in the lack of independence. Some parents maybe try to let their child to pack the school bag by themselves, but it may be a frequent occurrence that the children forget to do so or bring the wrong books, which greatly reduces child's learning effect and gives troubles to patents and teachers. Therefore, there remains a need for a new and improved design for a book detection system for school children to overcome the problems presented above.

SUMMARY OF THE INVENTION

The present invention provides an RFID book detection system for school children which comprises a plurality of book jackets, at least an assignment system, and a school bag. The book jackets respectively fit around different books, and each of the book jackets has a corresponding RFID tag on a surface thereof. Also, each of the RFID tags has an RFID which is configured to be saved and to represent a corresponding book, which is covered by the book jacket, in the assignment system. The assignment system is provided for saving and managing input information including at least a curriculum and the RFIDs on the RFID tags. After reading the input curriculum, the assignment system is configured to retrieve input RFIDs and to save daily course schedules in the form of RFIDs. Moreover, the assignment system is connected to a code reader for reading the RFID tags on the book jackets, thus checking the required books day to day. The school bag used for placing the books comprises a sensor which is connected to the assignment system to check whether the books in the school bag match the next day's course schedule on the input curriculum saved in the assignment system, wherein the sensor is connected to the assignment system through WIFI or Bluetooth. Moreover, the sensor can detect the books in the school bag and send alarm when a child fails to put the books exactly the same as the next day's course schedule on the curriculum in the assignment system into the school bag.

In one embodiment, the assignment system is a desktop computer, a laptop, a tablet, a smart phone, a smart TV, or two or more of above devices synchronously used.

In another embodiment, the sensor is connected to the assignment system through WIFI.

In still another embodiment, the sensor is connected to the assignment system through Bluetooth.

In a further embodiment, the RFID tag is a 13.56 MHz electronic tag which meets the standard of ISO14443A and has a reading distance in the range from 1 to 10 cm.

In still a further embodiment, the code reader is replaced by a decoder which meets the standard of ISO14443A and has its working voltage from DC 3.3V to DC 5V and working frequency at 1.356 MHz such that the decoder is adapted to automatically read and decode the RFID tag in a distance less than 60 mm.

In yet a further embodiment, the sensor of the school bag has a LED panel which is configured to display different lighting patterns in two situations that the books in the school bag match or are not exactly the same as the next day's course schedule on the input curriculum saved in the assignment system.

In a particular embodiment, the sensor has a braille generator which is adapted to display different braille displays in two situations that the books in the school bag match or are not exactly the same as the next day's course schedule on the input curriculum saved in the assignment system.

In a preferred embodiment, the sensor comprises a vibrator which is provided to produce vibrations when the books in the school bag are not exactly the same as the next day's course schedule on the input curriculum saved in the assignment system.

In an advantageous embodiment, the sensor has an audio output device which is configured to make different sounds in two situations that the books in the school bag match or are not exactly the same as the next day's course schedule on the input curriculum saved in the assignment system.

The present invention can better help school children to learn packing their school bags because: (i) the child can scan the RFIF tags on the book jackets one by one before putting the books into the school bag, and after reading the RFIF tag, the assignment system is configured to send a message showing the scanned book is needed or not needed to bring according to the next day's course schedule on the curriculum saved in the assignment system, which helps children to learn packing their school bag independently; and (ii) the sensor of the school bag connected to the assignment system can read the RFID tags to double check whether the books in the school bag match the next day's course schedule on the input curriculum saved in the assignment system, and when the books in the school bag are not exactly the same as the next day's course schedule on the input curriculum saved in the assignment system, the school bag is configured to send alarm to inform the child.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 7, the present invention provides an RFID book detection system for school children which comprises a plurality of book jackets (10), at least an assignment system (20), and a school bag (30). The book jackets (10) respectively fit around different books (11), and each of the book jackets (10) has a corresponding RFID tag (12) on a surface thereof, wherein each of the RFID tags (12) has an RFID which is configured to be saved and to represent a corresponding book (11), which is covered by the book jacket (10), in the assignment system (20). The assignment system (20) can be a desktop computer, a laptop, a tablet, a smart phone, a smart TV, or two or more of above devices synchronously used. The assignment system (20) is provided for saving and managing input information including at least a curriculum (21) and the RFIDs on the RFID tags (12), wherein after reading the input curriculum (21), the assignment system (20) is configured to retrieve input RFIDs and to save daily course schedules in the form of RFIDs. Moreover, the assignment system (20) is connected to a code reader (22) for reading the RFID tags (12) on the book jackets (10), thus checking the required books (11) day to day. The school bag (30) used for placing the books (11) comprises a sensor (31) which is connected to the assignment system (20) to check whether the books (11) in the school bag (30) match the next day's course schedule on the input curriculum (21) saved in the assignment system (20), wherein the sensor (31) is connected to the assignment system (20) through WIFI or Bluetooth. Moreover, the sensor (30) can detect the books (11) in the school bag (30) and send alarm when a child fails to put the books (21) exactly the same as the next day's course schedule on the curriculum (21) in the assignment system (20) into the school bag (30).

In actual application, referring to FIGS. 1 to 6, a child can respectively fit the book jackets (10) around the books (11), and the book jackets (10) respectively having their RFID tags (12) on the surfaces thereof can also protect the books (11). The RFID tags (12) on the book jackets (10) are formed without repetition, and the assignment system (20) can read the RFID tags (12) through the code reader (22), thus entering the information of the RFID tags (12) into the assignment system (20). Moreover, the curriculum (21) is also entered and saved in the assignment system (20). The child can scan the RFIF tags (12) on the book jackets (10) one by one before putting the books (11) into the school bag (30), and after reading the RFIF tag (12), the assignment system (20) is configured to send a message showing the scanned book (11) is needed or not needed to bring according to the next day's course schedule on the curriculum (21) saved in the assignment system (20). Furthermore, the sensor (31) of the school bag (30) connected to the assignment system (20) can read the RFID tags (12) to double check whether the books (11) in the school bag (30) match the next day's course schedule on the input curriculum (21) saved in the assignment system (20). When the books (11) in the school bag (30) are not exactly the same as the next day's course schedule on the input curriculum (21) saved in the assignment system (20), the school bag (30) is configured to send alarm to inform the child. Also, the sensor (31) of the school bag (30) has a LED panel (311) to inform the child whether the books (11) in the school bag (30) match the next day's course schedule on the input curriculum (21), wherein the LED panel (311) can display different lighting patterns in two situations that the books (11) in the school bag (30) match or are not exactly the same as the next day's course schedule on the input curriculum (21) saved in the assignment system (20).

Figure 1:
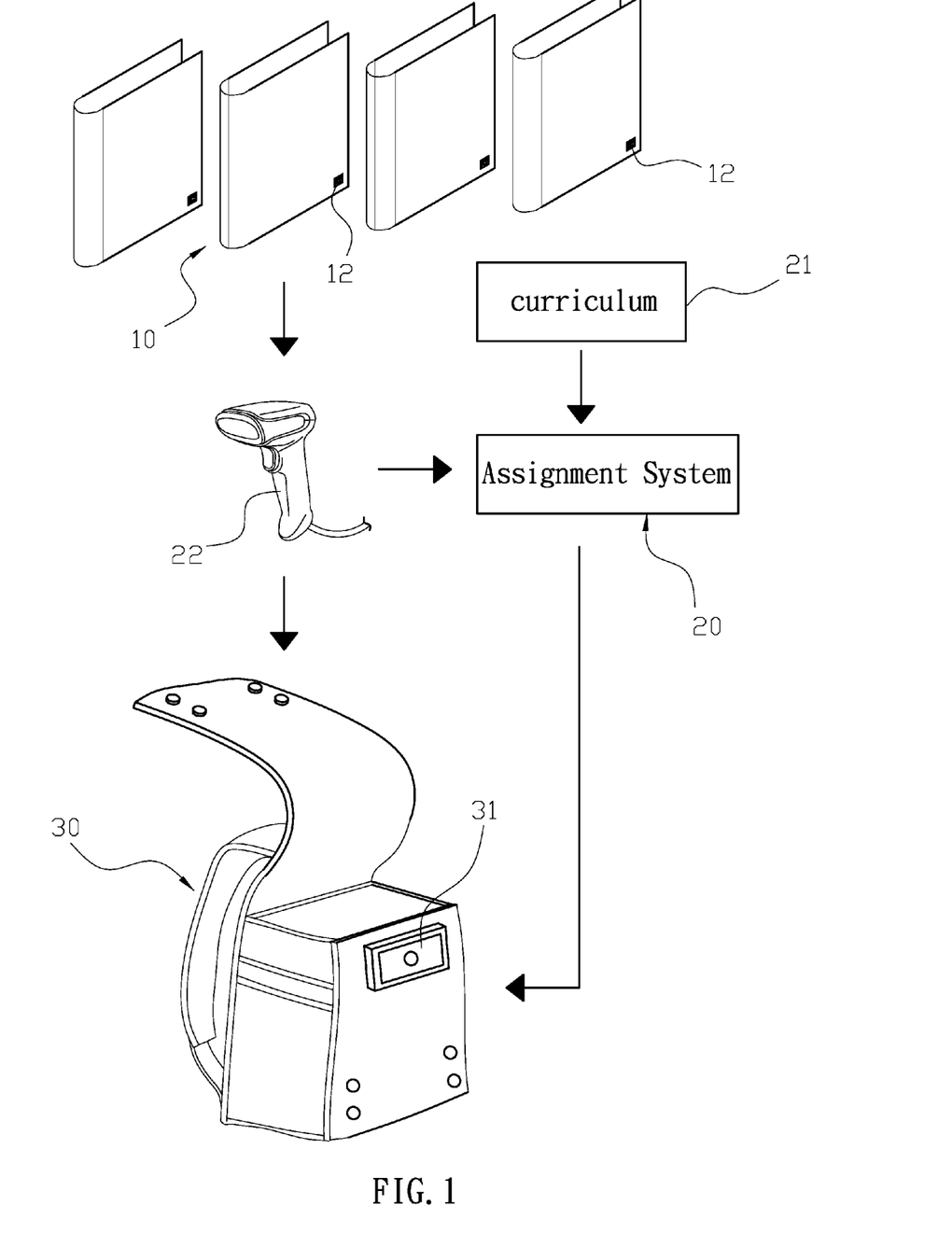
FIG. 1 is a schematic view of an RFID book detection system for school children in the present invention.
Figure 2:
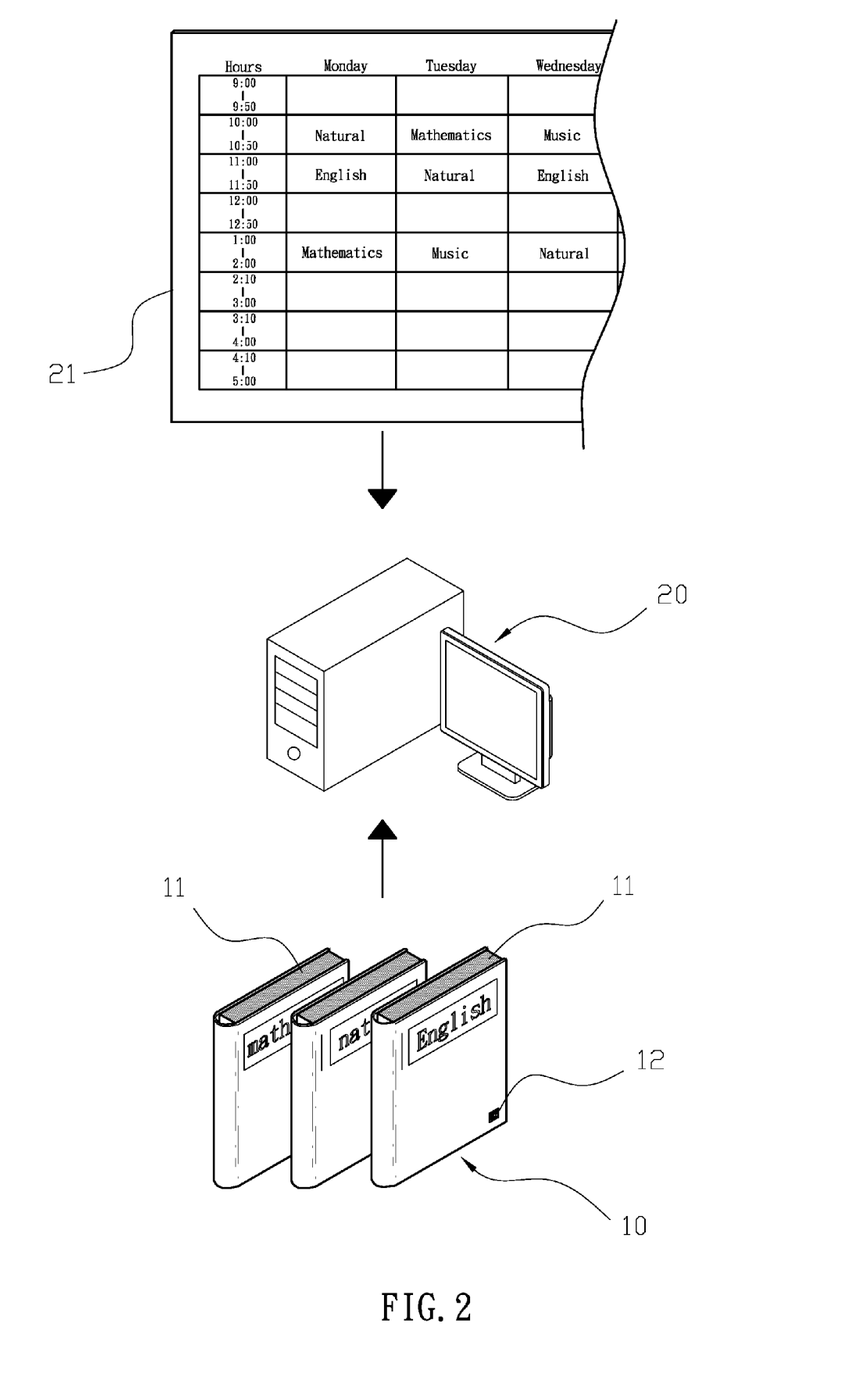
FIG. 2 is another schematic view of the RFID book detection system for school children in the present invention.
Figure 3:
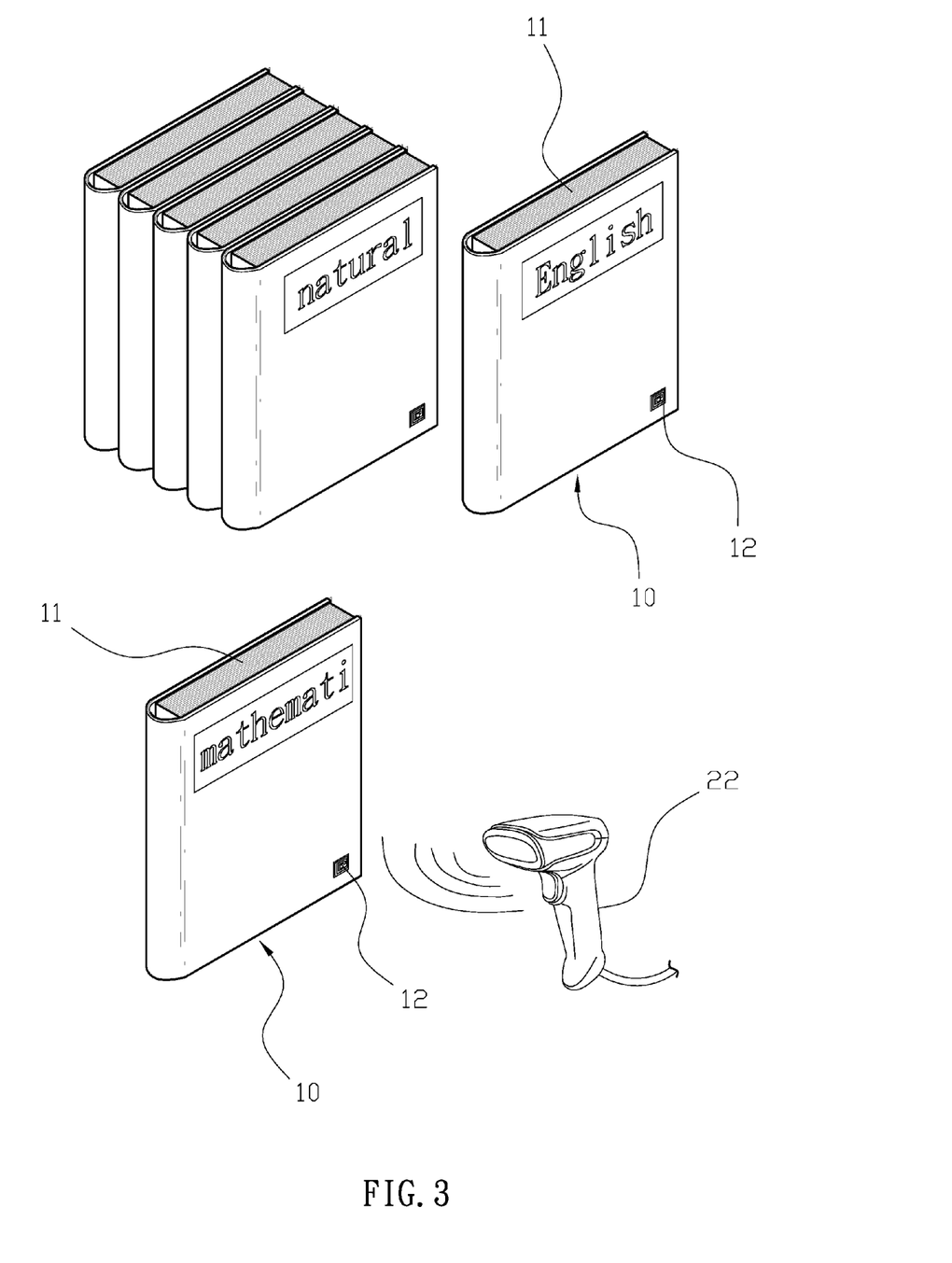
FIG. 3 is a third schematic view of the RFID book detection system for school children in the present invention.
Figure 4:
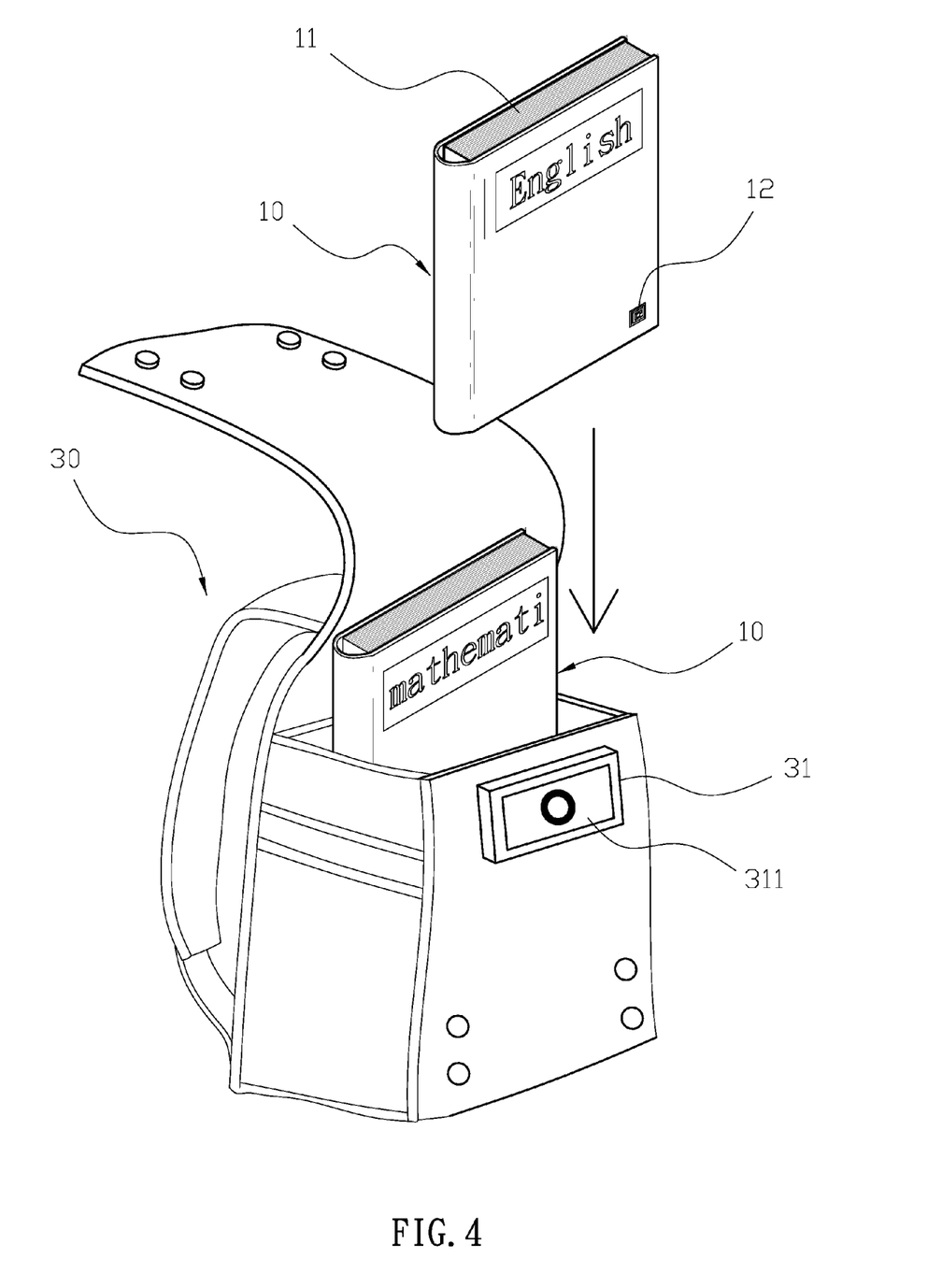
FIG. 4 is a fourth schematic view of the RFID book detection system for school children in the present invention.
Figure 5:
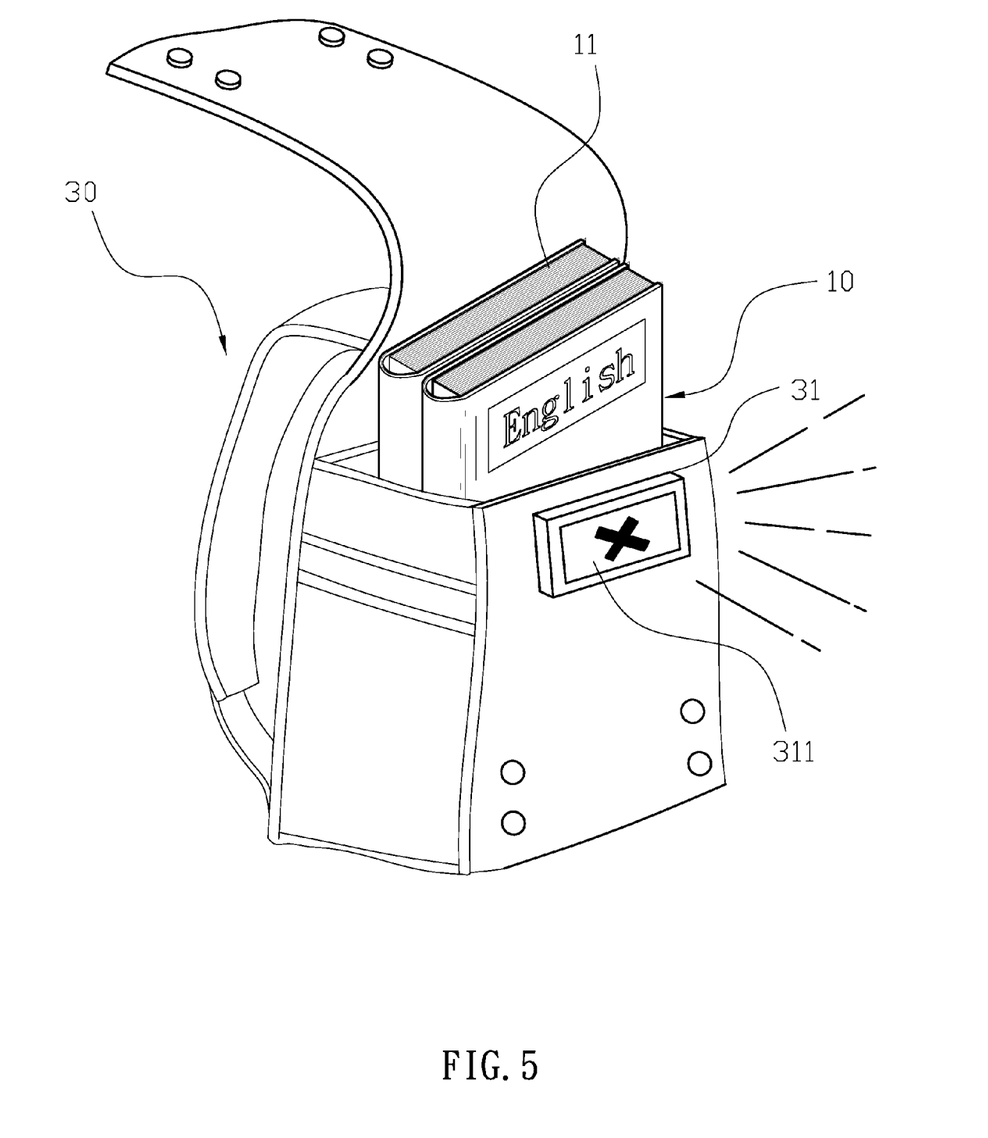
FIG. 5 is a fifth schematic view of the RFID book detection system for school children in the present invention.
Figure 6:
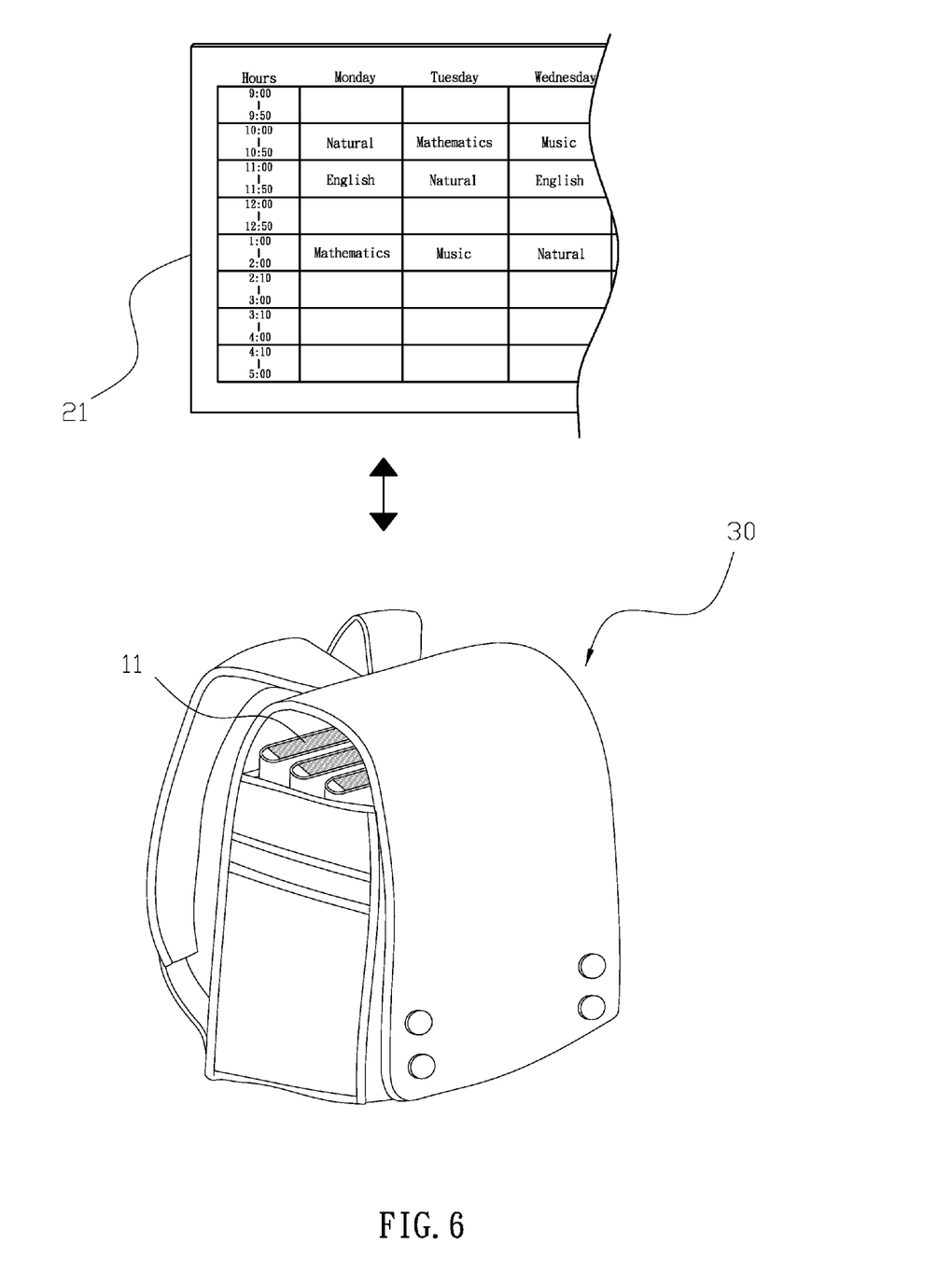
FIG. 6 is a sixth schematic view of the RFID book detection system for school children in the present invention.
Figure 7:
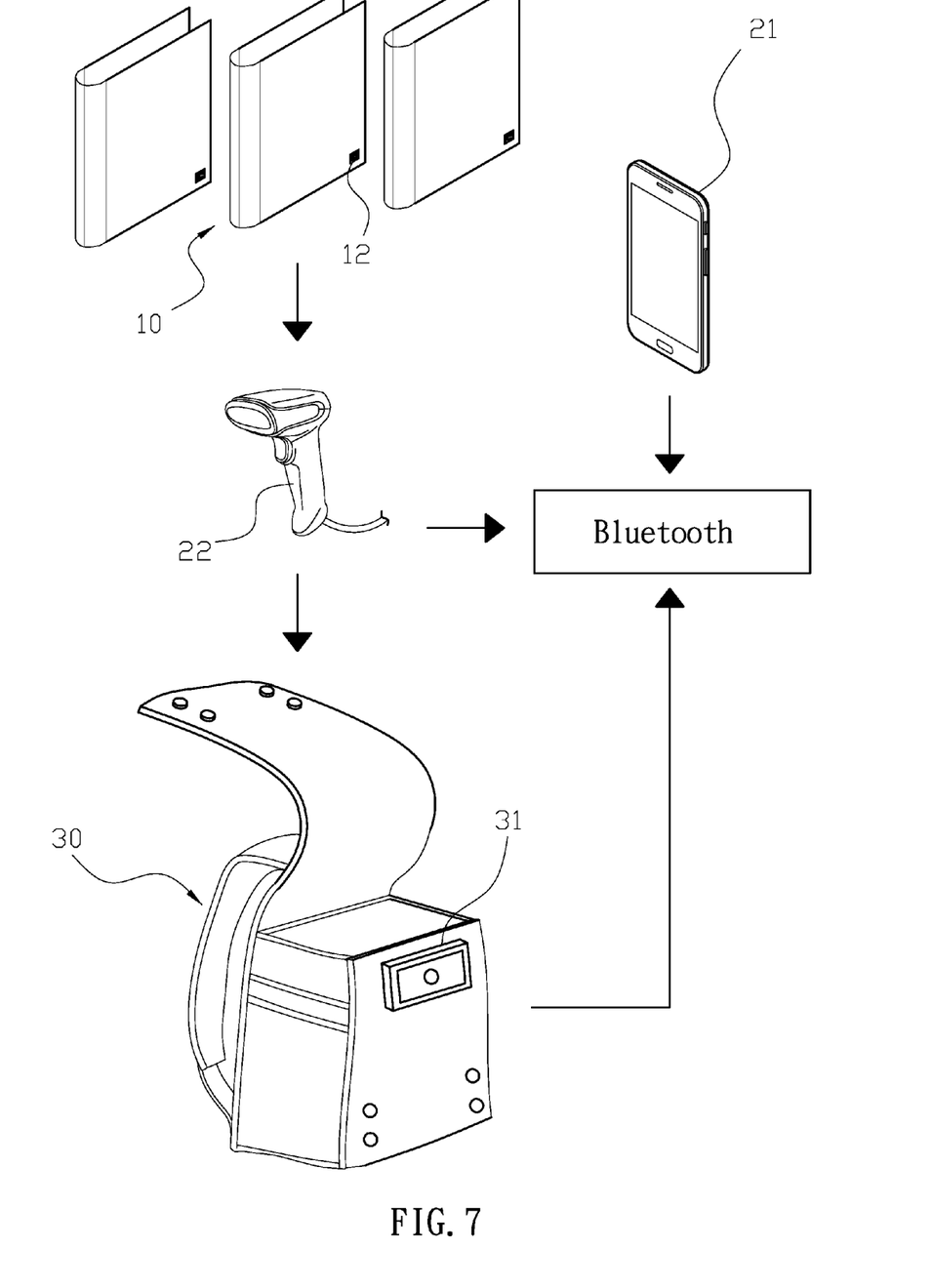
FIG. 7 is a schematic view of another embodiment of the RFID book detection system for school children in the present invention.
Figure 8:
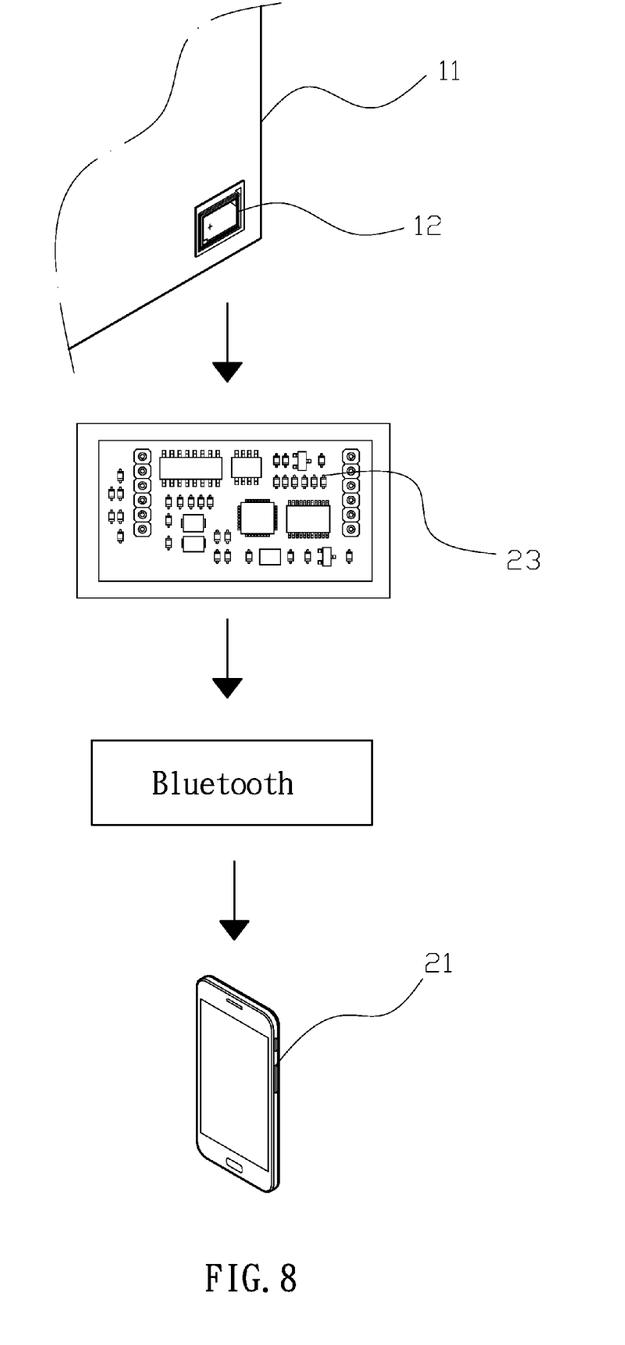
FIG. 8 is a schematic view of a third embodiment of the RFID book detection system for school children in the present invention.

In another embodiment, referring to FIG. 8, the RFID tag (12) is a 13.56 MHz electronic tag which meets the standard of ISO14443A and has a reading distance in the range from 1 to 10 cm. Also, the code reader (22) is replaced by a decoder (23) which meets the standard of ISO14443A and has its working voltage from DC 3.3V to DC 5V and working frequency at 1.356 MHz. Thus, the decoder (23) can automatically read and decode the RFID tag (12) in a distance less than 60 mm, thereby improving the convenience and accuracy of reading RFID tags (12).

Figure 9:
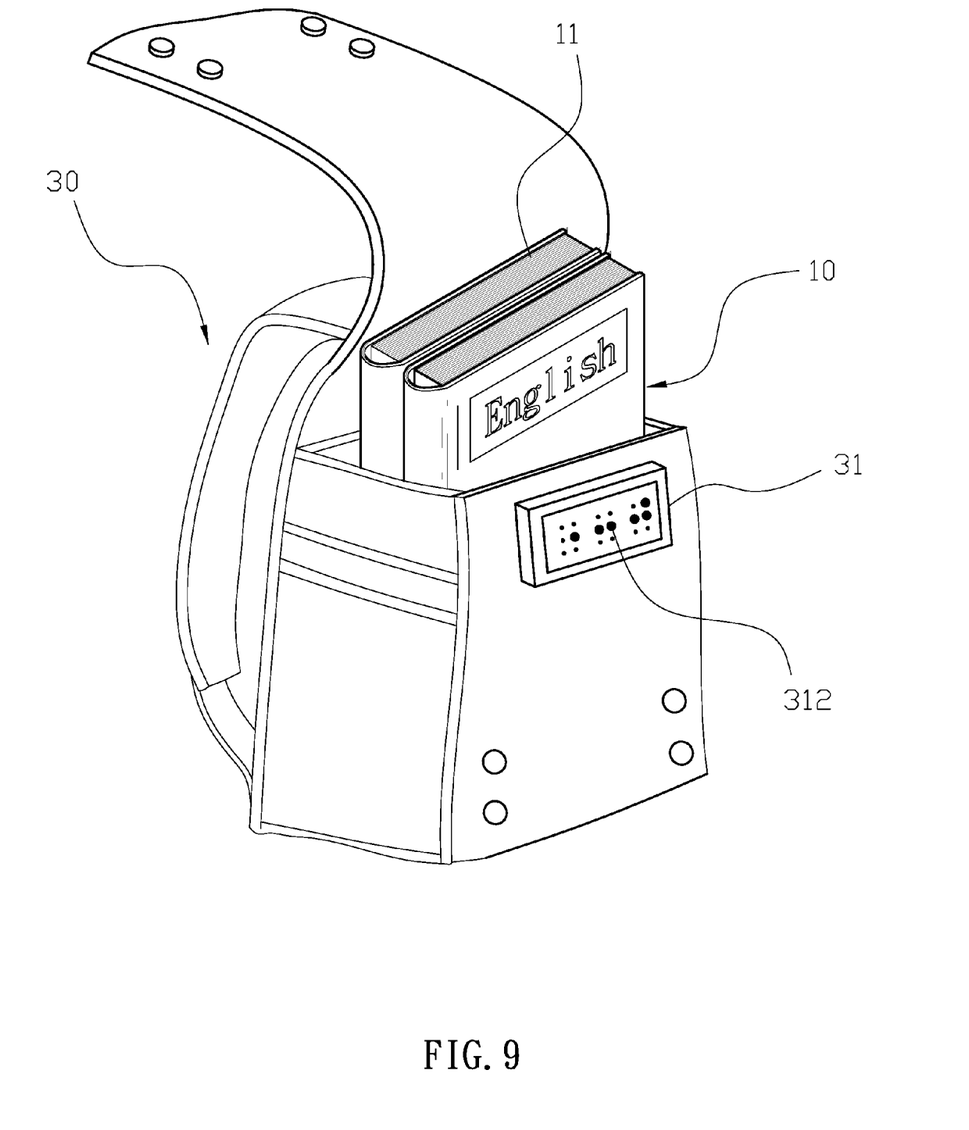
FIG. 9 is a schematic view illustrating a sensor of the RFID book detection system for school children is a braille generator in the present invention.

In still another embodiment, referring to FIG. 9, the sensor (31) has a braille generator (312) which is configured to display different braille displays in two situations that the books (11) in the school bag (30) match or are not exactly the same as the next day's course schedule on the input curriculum (21) saved in the assignment system (20).

Figure 10:
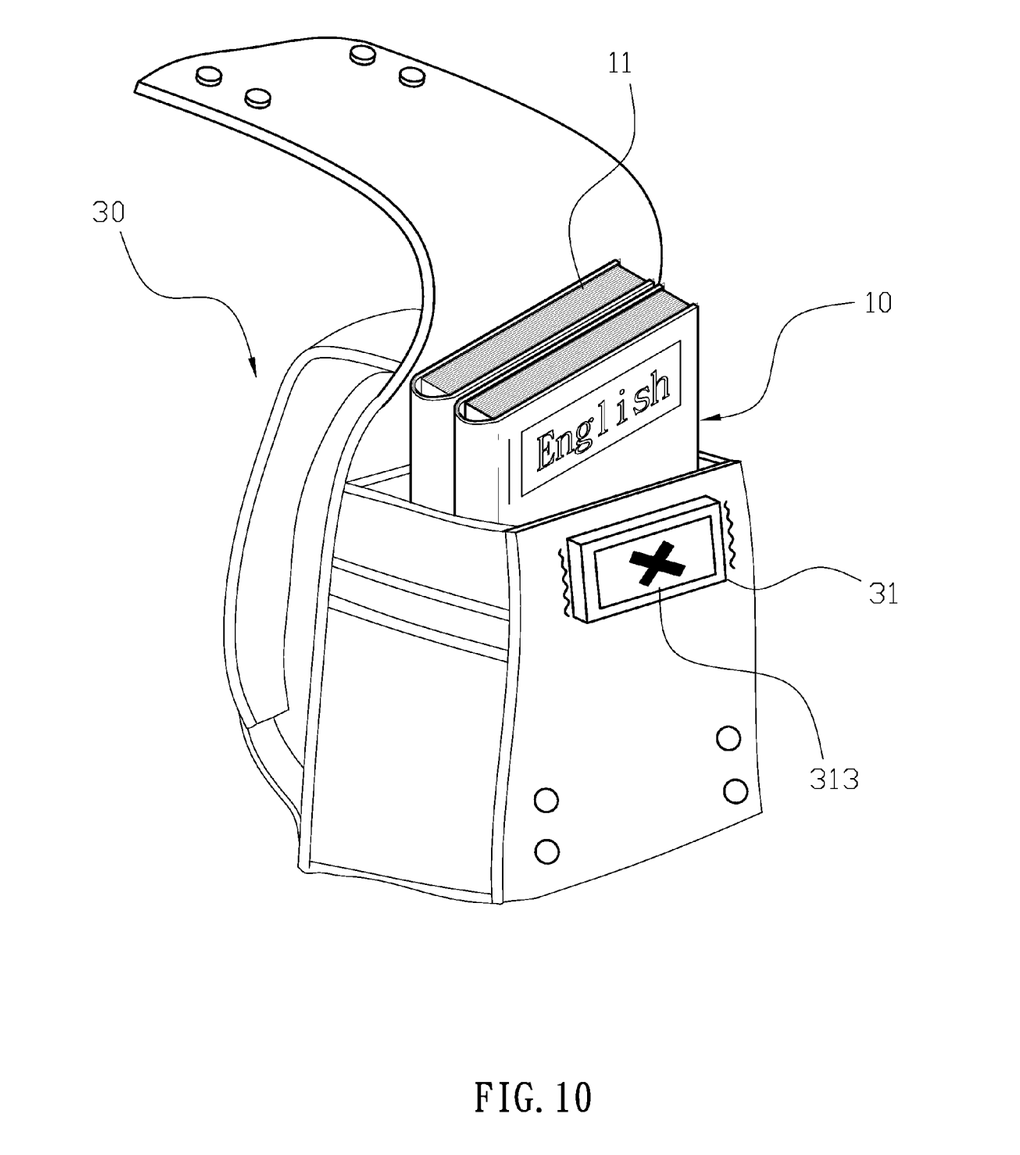
FIG. 10 is a schematic view illustrating the sensor of the RFID book detection system for school children is a vibrator in the present invention.

In a further embodiment, referring to FIG. 10, the sensor (31) comprises a vibrator (313) which is adapted to produce vibrations when the books (11) in the school bag (30) are not exactly the same as the next day's course schedule on the input curriculum (21) saved in the assignment system (20).

Figure 11:
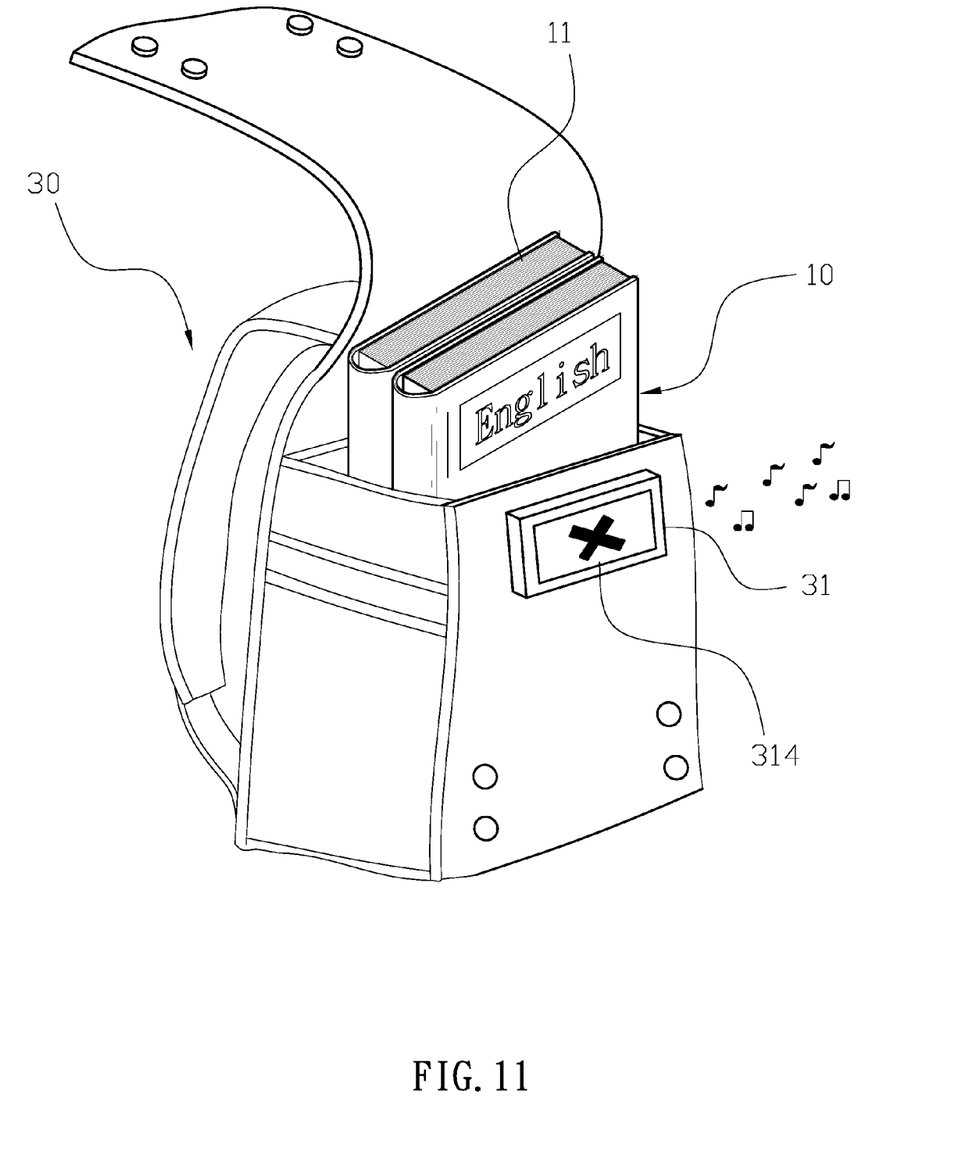
FIG. 11 is a schematic view illustrating the sensor of the RFID book detection system for school children is an audio output device in the present invention.

In still a further embodiment, referring to FIG. 11, the sensor (31) has an audio output device (314) which is provided to make different sounds in two situations that the books (11) in the school bag (30) match or are not exactly the same as the next day's course schedule on the input curriculum (21) saved in the assignment system (20), and the sounds can be designed for individual children to enhance the practicability of the present invention.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An RFID book detection system for school children comprising:
    a plurality of book jackets respectively fitting around different books, and each of the book jackets having a corresponding RFID tag on a surface thereof to represent the corresponding book covered by the book jacket;
    at least an assignment system adapted to save and manage input information including at least a curriculum and RFIDs on the RFID tags; after reading the input curriculum, the assignment system configured to retrieve RFIDs corresponding to the courses on the input curriculum and to save daily course schedules in the form of RFIDs; a code reader connected to the assignment system for reading the RFID tags on the book jackets, thus checking the required books day to day; and
    a school bag, which is used for placing the books, comprising a sensor, which is connected to the assignment system and is configured to detect the books in the school bag and send alarm when a child failing to put the books exactly the same as the next day's course schedule on the input curriculum, which is saved in the assignment system, into the school bag,
    wherein the sensor has a braille generator which is adapted to display different braille displays in two situations that the books in the school bag match or are not exactly the same as the next day's course schedule on the input curriculum saved in the assignment system.

2. The RFID book detection system for school children of claim 1, wherein the assignment system is a desktop computer, a laptop, a tablet, a smart phone, a smart TV, or two or more of above devices synchronously used.

3. The RFID book detection system for school children of claim 2, wherein the sensor is connected to the assignment system through WIFI.

4. The RFID book detection system for school children of claim 2, wherein the sensor is connected to the assignment system through Bluetooth.

5. The RFID book detection system for school children of claim 1, wherein the RFID tag is a 13.56 MHz electronic tag which meets the standard of ISO14443A and has a reading distance in the range from 1 to 10 cm.

6. The RFID book detection system for school children of claim 5, wherein the code reader is replaced by a decoder which meets the standard of ISO14443A and has its working voltage from DC 3.3V to DC 5V and working frequency at 1.356 MHz such that the decoder is adapted to automatically read and decode the RFID tag in a distance less than 60 mm.

7. The RFID book detection system for school children of claim 1, wherein the sensor of the school bag has a LED panel which is configured to display different lighting patterns in two situations that the books in the school bag match or are not exactly the same as the next day's course schedule on the input curriculum saved in the assignment system.

8. The RFID book detection system for school children of claim 1, wherein the sensor comprises a vibrator which is provided to produce vibrations when the books in the school bag are not exactly the same as the next day's course schedule on the input curriculum saved in the assignment system.

9. The RFID book detection system for school children of claim 1, wherein the sensor has an audio output device which is configured to make different sounds in two situations that the books in the school bag match or are not exactly the same as the next day's course schedule on the input curriculum saved in the assignment system.

* * * * *